United States Patent
Tang

(10) Patent No.: US 7,667,852 B2
(45) Date of Patent: Feb. 23, 2010

(54) MEASURING THE SHAPE, THICKNESS VARIATION, AND MATERIAL INHOMOGENEITY OF A WAFER

(75) Inventor: Shouhong Tang, Tucson, AZ (US)

(73) Assignee: KLA-Tencor Corporation, Milpitas, CA (US)

( * ) Notice: Subject to any disclaimer, the term of this patent is extended or adjusted under 35 U.S.C. 154(b) by 140 days.

(21) Appl. No.: 12/039,185

(22) Filed: Feb. 28, 2008

(65) Prior Publication Data

US 2008/0285053 A1 Nov. 20, 2008

Related U.S. Application Data

(60) Provisional application No. 60/938,337, filed on May 16, 2007.

(51) Int. Cl.
*G01B 11/02* (2006.01)

(52) U.S. Cl. .................... 356/511; 356/503

(58) Field of Classification Search ............. 356/503, 356/511, 505, 510, 514
See application file for complete search history.

(56) References Cited

U.S. PATENT DOCUMENTS

| 6,847,458 B2* | 1/2005 | Freischlad et al. ......... 356/503 |
| 6,885,461 B2* | 4/2005 | Tang ........................ 356/514 |
| 2008/0117436 A1* | 5/2008 | Altenberger et al. ....... 356/521 |

* cited by examiner

*Primary Examiner*—Tarifur Chowdhury
*Assistant Examiner*—Jonathan M Hansen
(74) *Attorney, Agent, or Firm*—Luedeka, Neely & Graham, P.C.

(57) ABSTRACT

In one embodiment, an interferometer system comprises an unequal path interferometer assemble comprising; a first reference flat having a first length L1 in a first dimension, a second reference flat having a second length L2 in the first dimension, a cavity D1 defined by a distance between the first reference flat and the second reference flat, and a receptacle to receive an object in the cavity such that an optical path remains open between the first reference flat and the second reference flat, and a radiation targeting assembly to direct a collimated radiation beam to the interferometer assembly, a radiation collecting assembly to collect radiation received from the interferometer assembly, and a controller comprising logic to; vary a wavelength of the collimated radiation beam, record interferograms formed by a plurality of surfaces, extract phases of each of the interferograms for each of the plurality of surfaces to produce multiple phase maps, and determine each phase map from its corresponding interferogram, using a weighted least-square algorithm.

10 Claims, 4 Drawing Sheets

MEASURING THE SHAPE, THICKNESS VARIATION, AND MATERIAL INHOMOGENEITY OF A WAFER

RELATED APPLICATIONS

This application claims the benefit of U.S. Provisional Patent Application Ser. No. 60/938,337, filed May 16, 2007, entitled MEASURING THE SHAPE, THICKNESS VARIATION, AND MATERIAL INHOMOGENEITY OF A WAFER, the disclosure of which is incorporated herein by reference in its entirety.

BACKGROUND

This invention relates to radiation-based inspection techniques, and more particularly to interferometric profilometry systems and methods which may be used to measure the shape, thickness, and material inhomogeneity of a wafer.

Phase shifting interferometry (PSI) is a highly accurate and efficient phase measuring method applied to a variety of applications including optical testing, surface profilometry, surface roughness estimation, and surface displacement measurement. The fundamental concept of PSI is that the phase of an interferogram can be extracted accurately by acquiring a set of phase-shifted interferograms. The phase shifts between interferograms are produced by changing the optical path difference (OPD) between the measurement surface and a reference surface. The phase shifts also can be achieved by changing the wavelength of the radiation used, if the OPD between the measurement surface and the reference surface is not zero.

DETAILED DESCRIPTION

Figure 1:
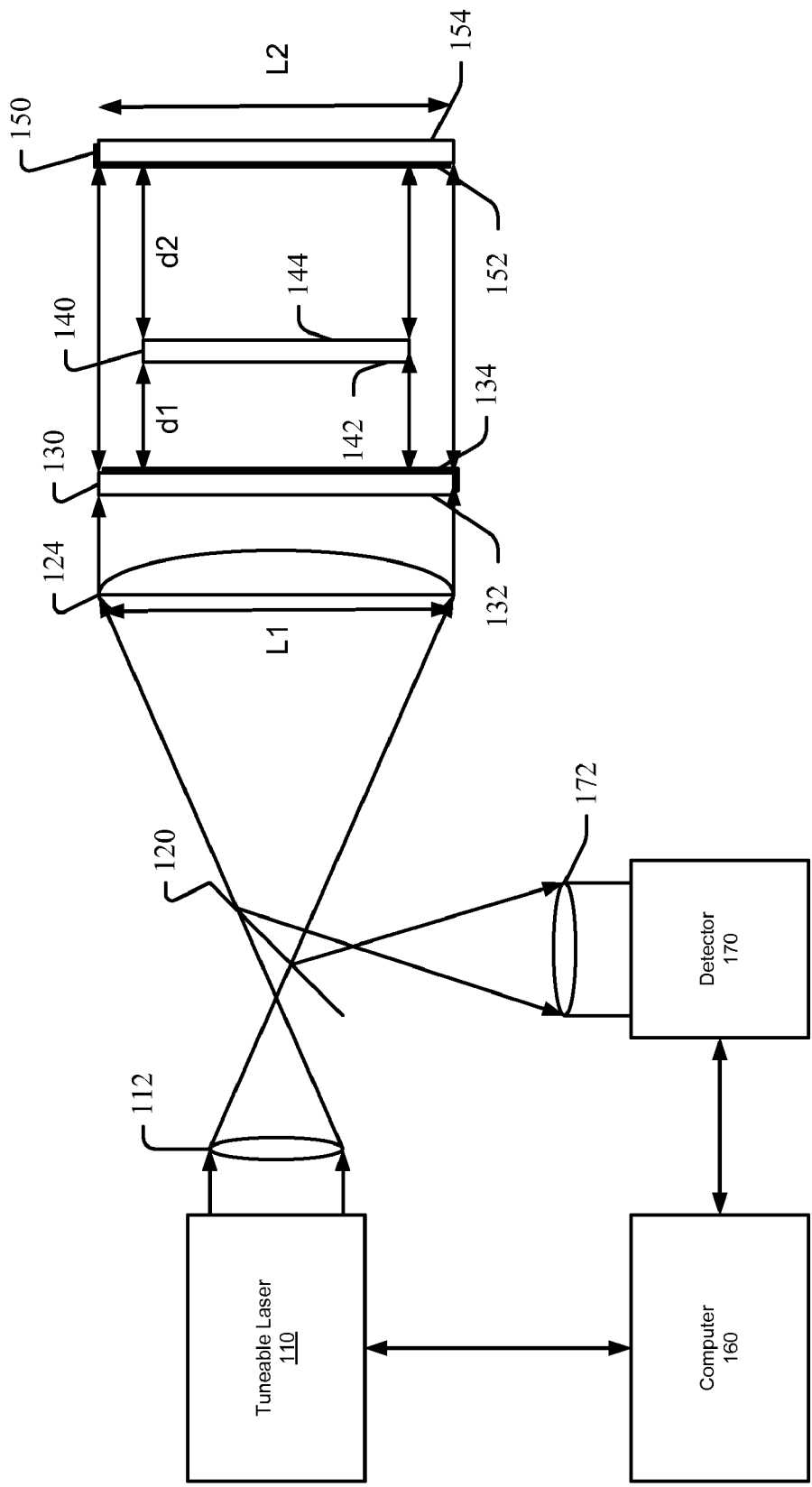
FIG. 1 is a schematic illustration of an interferometer assembly according to embodiments.

Described herein are exemplary systems and methods which may be used to measure the shape, thickness, and material inhomogeneity of a wafer. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

Embodiments described herein may be used in conjunction with an unequal path length interferometer (such as a Fizeau or Twyman-Green interferometer), contemporaneously extracting phases of all of the individual interferograms from a set of intensity frames that record superimposed interferograms generated with wave fronts reflected from multiple reflective surfaces. These intensity frames are acquired sequentially, by changing the wavelength in a measurement system. The wavelength can be changed mechanically, or, preferably, with a tunable laser light source. In some embodiments, contemporaneous events may be defined as events that happen within a reasonable time period of one another, given the technical circumstances.

The method takes advantage of the fact that the phase shift which results from the wavelength shift for a given interferogram is proportional to the OPD of that interferogram. In other words, the phases of each of the interferograms in the superimposed interferograms shift at different speeds during acquisition. The method of the preferred embodiment of this invention also takes advantage of the fact that the solutions of the least-square fitting technique (which is used and which is described in greater detail subsequently) with respect to an orthogonal basis, are completely independent of each other. As a consequence, the underlying phases of interferograms carried with the solutions are fully separable also.

In general, the system and method of the preferred embodiment of the invention produces a phase map or profile for each interferogram from a set of superimposed interferograms. When a particular interferogram corresponds to the OPD between a measuring surface and the reference plane, the phase map (mapping profile) of this particular interferogram represents the shape of the measuring surface. When an interferogram corresponds to the OPD between the front surface and the back surface of a plate (the object being measured), the phase map of this interferogram represents the thickness, or the distribution of the refractive index, of the plate. As a consequence, the method and system disclosed can be used to measure or profile surfaces, plate thickness, and refractive index inhomogeneity of an optical element or object from superimposed multiple interferograms by using PSI.

The method of the preferred embodiment is capable of separating multiple interferograms superimposed on the recording plane, as long as the phase shift speeds of these interferograms are different during acquisition, and there are enough intensity frames recorded. Consequently, the method is capable of measuring shapes of multiple reflective surfaces (greater than two). In addition, the method is capable of measuring multiple plate thicknesses.

FIG. 1 is a schematic illustration of an interferometer assembly according to embodiments. In some embodiments, the unequal path interferometer may be a Fizeau interferometer. In some embodiments, the unequal path interferometer may be a Twyman-Green interferometer. Referring to FIG. 1, an interferometer assembly includes a tunable laser 110 coupled to a computer 160, which is in turn coupled to a detector 170. The interferometer assembly further includes a radiation directing assembly that comprises a focusing lens 112, a beam splitter 120, and a collimator 124. The interferometer assembly further includes a first reference flat 130 that comprises a front surface 134 and a back surface 132 and a second reference flat 150 that comprises a front surface 152 and a back surface 154. The region between the front surface 134 of the first reference flat 130 and the front surface 152 of the second reference flat 150 defines an interferometer cavity 136. In some embodiments, an interferometer with two reference flats, such as the interferometer depicted in FIG. 1, may be able to monitor tilt changes of reference flats (130, 150) with every measurement thereby significantly increasing measurement repeatability. The object under test, typically a wafer 140, may be positioned in the cavity 136 between the first reference flat 130 and the second reference flat 150. The wafer comprises a front surface 142 and a back surface 144.

In some embodiments, an interferometer with two reference flats that are larger sizes than a test object, such as the interferometer depicted in FIG. 1, may be able to determine the location of a testing object in the imaging plane very precisely. In such an embodiment, the interferometer may obtain the test object's edge by using a cavity map instead of using the wafer surface or thickness variation maps, therefore the location of a test object's edge may be determined in such a way as to be free from errors resulting from the surface slope at any edge of test object.

In some embodiments, a wafer may be placed at a distance between the first reference flat front surface 134 and the first wafer surface 142 equaling 3 T, where T the wafer optical thickness. In some embodiments, a wafer may be placed at a distance between the second reference flat front surface 152 and the second wafer surface 144 equaling 5 T. A wafer optical thickness may be determined by multiplying the refractive index n with the thickness of the wafer t (T=nt).

In some embodiments, an interferometer phase shifting speed may be calibrated such that the phase shift of the optical thickness T of a wafer is equal to 22.5 degrees. In such embodiments, this may be accomplished by placing a polished opaque plate in a cavity formed between reference flats. In some embodiments, an interferometer may acquire 89 intensity frames while varying the wavelength of a light source. The set of recorded intensity frames for p superimposed interferograms may be expressed as $$g_m = a_0 + \sum_{j=1}^{p} a_j \cos(\Phi_j + \theta_{jm}), \text{ for } m = 1, 2, \ldots, 8, 9. \qquad (1)$$

where $g_m$ is the mth acquisition, $a_0$ is the background, $a_j$ is the modulation of jth interferogram, $\Phi_j$ is the phase of jth interferogram related to optical path difference of the testing surface and the reference mirror or the optical path difference between testing surfaces, and $\theta_{jm}$ is the mth phase shift for jth interferogram. In some embodiments, an interferometer may exact phases of all individual interferograms from the set of intensities by solving the following equation for X, $$A \cdot X = Y \qquad (2)$$

where $$A_{jk} = \sum_{m=1}^{89} w_m \phi_m(m) \phi_k(m), \; X_j = x_j, \; Y_j = \sum_{m=1}^{89} w_m I_m \phi_j(m), \qquad (3)$$

$$\phi_0 = 1, \; \phi_{2j-1}(m) = \cos\theta_{jm}, \text{ and } \phi_{2j}(m) = \sin\theta_{jm}, \qquad (4)$$

for $m = 1, 2, \ldots, 89$ and $j = 1, 2, \ldots, p$, and $$w_{m=1\ldots 89} = \begin{bmatrix} 0.0001 & 0.0007 & 0.0029 & 0.0084 & 0.0207 & 0.0446 & 0.0877 & 0.1603 \\ 0.2762 & 0.4531 & 0.7130 & 1.0821 & 1.5914 & 2.2768 & 3.1787 & 4.3425 \\ 5.8177 & 7.6570 & 9.9151 & 12.646 & 15.904 & 19.738 & 24.188 & 29.286 \\ 35.052 & 41.490 & 48.588 & 56.318 & 64.630 & 73.459 & 82.719 & 92.305 \\ 102.09 & 111.94 & 121.71 & 131.22 & 140.32 & 148.83 & 156.59 & 163.44 \\ 169.25 & 173.90 & 177.29 & 179.36 & 180.05 & 179.36 & 177.29 & 173.90 \\ 169.25 & 163.44 & 156.59 & 148.83 & 140.32 & 131.22 & 121.71 & 111.94 \\ 102.09 & 92.305 & 82.719 & 73.459 & 64.630 & 56.317 & 48.588 & 41.490 \\ 35.052 & 29.286 & 24.188 & 19.738 & 15.904 & 12.646 & 9.9151 & 7.6570 \\ 5.8177 & 4.3425 & 3.1787 & 2.2768 & 1.5914 & 1.0821 & 0.7130 & 0.4531 \\ 0.2762 & 0.1603 & 0.0877 & 0.0446 & 0.0207 & 0.0084 & 0.0029 & 0.0007 \\ 0.0001 \end{bmatrix} * 0.0002.$$

In such embodiments, phases may then be calculated through the equation:

$$\Phi_j = \tan^{-1} \frac{x_{2j}}{x_{2j-1}} \text{ for } j = 1, 2, \ldots p. \qquad (5)$$

In some embodiments, a weighted least square algorithm functions to provide an orthogonal least-square fitting to produce a phase map for each interferogram. In some embodiments, a weighted least-square algorithm may be used to produce a phase map for each interferogram with N-frame acquisition for p superimposed interferograms and may use an algorithm corresponding to:

$$\Phi_j = \tan^{-1} \frac{x_{2j}}{x_{2j-1}} \text{ for } j = 1, 2, \ldots p. \qquad (6)$$

where $x_{2j}$ and $x_{2j-1}$ are two elements of the solution $$\sum_{k=0}^{2p} x_k \sum_{m=1}^{n} w_m \phi_k(m) \phi_j(m) = \sum_{m=1}^{n} w_m I_m \phi_j(m) \qquad (7)$$

for $j = 0, 1, 2, \ldots, 2p$.

In some embodiments, the weighted least-square algorithm generates a set of optimal weights dynamically to provide the ideal basis for separating each of the individual interferograms from one another. In some embodiments, a least-square fitting algorithm may be used to exact all phases of all superimposed interferograms contemporaneously to produce multiple phase maps, each map for its corresponding interferogram. In some embodiments, contemporaneous events may be defined as events that occur within a reasonable time period of one another, given the technical circumstances. In some embodiments, extracting phases of each of the interferograms may be effected by a computer. In some embodiments, recording the multiple optical interferograms may be effected by means of a CCD camera.

Figure 2A:
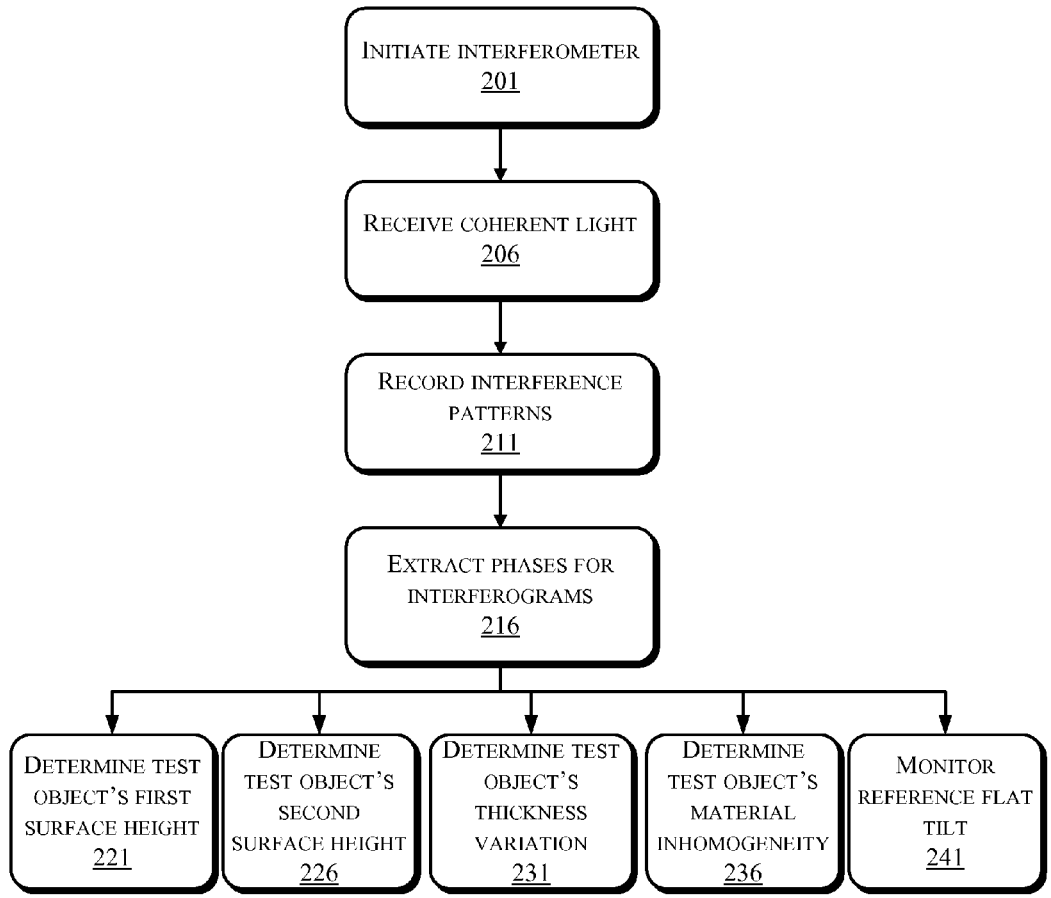
FIG. 2A is a flowchart illustrating operations of a method which may be used to measure the shape, thickness, and material inhomogeneity of a wafer according to an embodiment.

FIG. 2A is a flowchart illustrating operations of a method which may be used to measure the shape, thickness, and material inhomogeneity of a wafer according to an embodiment. At operation 201, an interferometer may be initiated. In some embodiments, a test object such as, but not limited to, a wafer may be placed in the interferometer. By way of example and not limitation, the interferometer may be a Fizeau interferometer, a Twyman-Green interferometer, or the like. At operation 206, coherent light may be supplied to a test object. In some embodiments, the coherent light may be supplied by a tunable laser or the like. At operation 211, an interferometer may record interference patterns. In some embodiments, recording the multiple optical interferograms may be effected by means of a CCD camera. At operation 216, interferograms may be extracted from data recorded by the interferometer. In some embodiments, extracting phases of each of the interferograms may be effected by a computer.

In some embodiments, analysis of these interferograms allows for the determination of various information, such as but not limited to; a test object's first surface height (operation 221), a test object's second surface height (operation 226), a test object's thickness variation (operation 231), a test object's material inhomogeneity (operation 236), and reference surface tilt (241). By way of example and not limitation, arbitrarily identifying the phase of the interferogram formed by the front reference plate 130 and the front 142 of the wafer 140 surface as A, and the phase of the interferogram formed by the front reference flat 150 and the back surface 144 of the wafer 140 as B, and the phase of the interferogram formed by both sides 142, 144 of the wafer 140 as T, and the phase of the interferogram formed by the cavity of the front reference flat 130 and the back reference flat 150 as C, then the surface parameters may be determined as follows: A corresponds to the front surface height of the wafer 140, B corresponds to the back surface height of the wafer, C−(A+B) corresponds to the thickness variation in the wafer 140, and T+A+B−C corresponds to the material inhomogeneity.

Figure 2B:
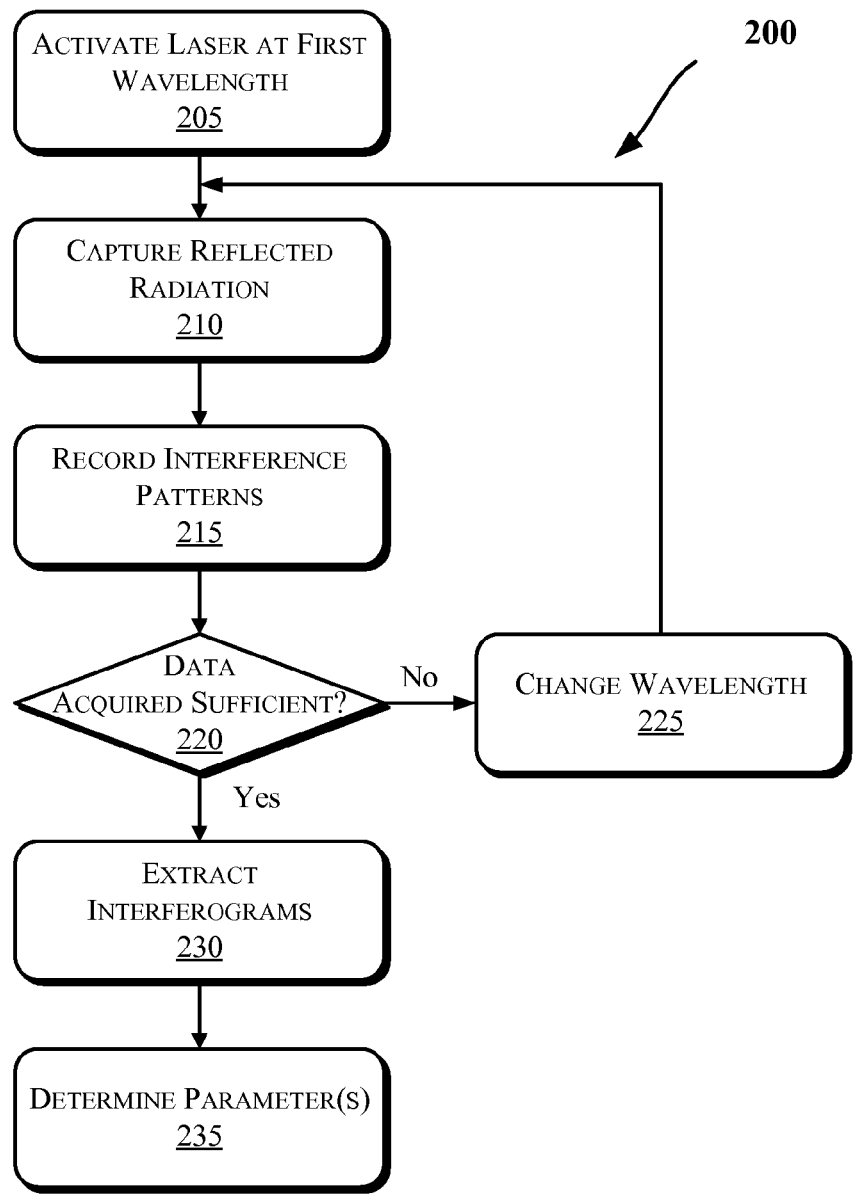
FIG. 2B is a flowchart illustrating operations of a method which may be used to measure the shape, thickness, and material inhomogeneity of a wafer according to an embodiment.

FIG. 2B is a flowchart illustrating operations of a method which may be used to measure the shape, thickness, and material inhomogeneity of a wafer according to an embodiment. At operation 205 the laser is activated at a first wavelength. In operation, the computer 160 generates a signal to the tunable laser to activate the laser 110 at a first wavelength. In some embodiments, the laser 110 generates electromagnetic radiation in a range of wavelengths for which the wafer 140 is transmissive. The radiation from the laser 110 is supplied through focusing lens 112 to beam splitter 120, from which the light passes through a collimating lens 124 to supply coherent light to a first reference flat 130, the wafer 140, and the second reference flat 150.

A portion of the radiation incident on the first reference flat 130 is reflected. A remaining portion of the radiation incident on the first reference flat is transmitted through the first reference flat 130. A portion of the transmitted radiation is incident on wafer 140, a portion of which is reflected by the front surface 142 of the wafer 140, and a portion of which is reflected by the back surface 144 of the wafer 140. A portion of the radiation incident on the wafer 140 is transmitted through the wafer 140 onto the second reference 150, and is reflected from the surface 152. Further, a portion of the radiation transmitted through the first reference flat 130 is transmitted directly to the second reference flat 150, and is reflected from the surface 152.

At operation 210 radiation reflected is captured. In some embodiments, radiation reflected is captured as the wavelength of radiation is changing. The reflected radiation is directed by the beam splitter 120 to an imaging lens 172 which supplies, contemporaneously, multiple interferograms to a detector 170 (e.g., a CCD camera or other suitable recording planes). In some embodiments, contemporaneous events may be defined as events that occur within a reasonable time period of one another, given the technical circumstances. The detector 170 may include a frame grabber for storing images; alternatively, the computer 160 may be configured to provide this function. In any event, the images obtained by the detector 170 are supplied to the computer 160 for processing to produce the desired profiles in a suitable form for immediate display, or storage for subsequent utilization. At operation 215 interference patterns in the reflected radiation are captured.

If, at operation 220, the amount of data acquired is not sufficient, then control passes to operation 225 and the wavelength of the radiation generated by laser 110 is changed. In some embodiments, if the amount of data acquired in not sufficient, the control passed to operation 225 to keep changing its wavelength. For example, the wavelength may be increased or decreased by a predetermined amount. Control then passes back to operation 210 and the reflected radiation is captured. Operations 210-225 are repeated until an adequate number of data samples are acquired, whereupon control passes to operation 230 and one or more phases of interferograms are extracted from the data collected. In some embodiments, a control passed to operation 225 to stop its wavelength changing while another control passed to operation 230. In some embodiments, the phases of interferograms may be extracted using techniques set forth in U.S. Pat. No. 6,885,461, the disclosure of which is incorporated herein by reference in its entirety.

At operation 235 one or more parameters are determined from the phases of interferograms extracted in operation 230. By way of example and not limitation, arbitrarily identifying the phase of the interferogram formed by the front reference plate 130 and the front 142 of the wafer 140 surface as A, and the phase of the interferogram formed by the back reference flat 150 and the back surface 144 of the wafer 140 as B, and the phase of the interferogram formed by both sides 142, 144 of the wafer 140 as T, and the phase of the interferogram formed by the cavity of the front reference flat 130 and the back reference flat 150 as C, then the surface parameters may be determined as follows: A corresponds to the front surface height of the wafer 140, B corresponds to the back surface height of the wafer, C−(A+B) corresponds to the thickness variation in the wafer 140, and T+A+B−C corresponds to the material inhomogeneity.

Figure 3:
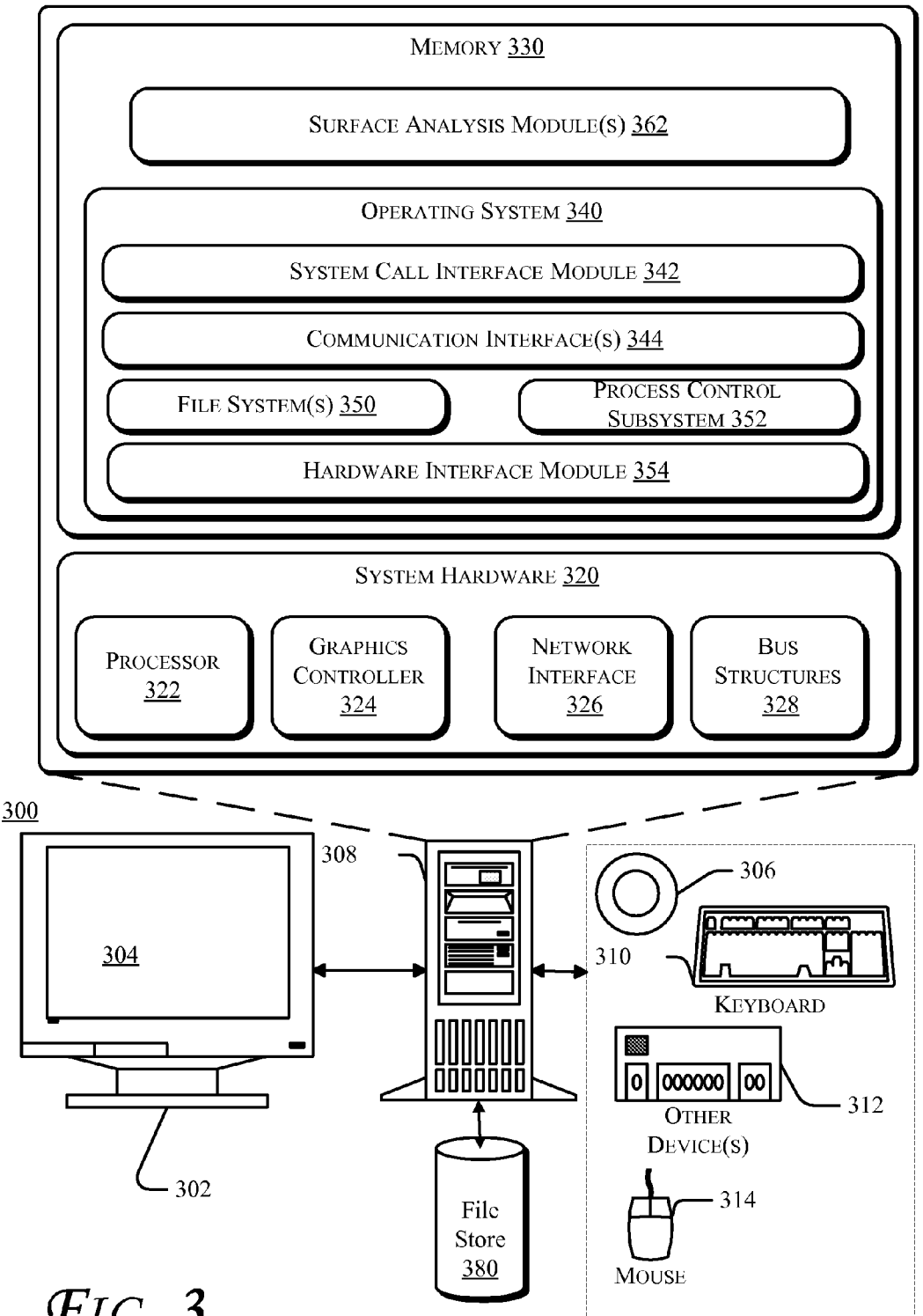
FIG. 3 is a schematic illustration of an integrated visible pilot beam for non-visible interferometric device according to an embodiment.

FIG. 3 is a schematic illustration of one embodiment of a computing system which may be used to implement the computer 160 of FIG. 1. The computer system 300 includes a computer 308 and one or more accompanying input/output devices 306 including a display 302 having a screen 304, a keyboard 310, other I/O device(s) 312, and a mouse 314. The other device(s) 312 can include a touch screen, a voice-activated input device, a track ball, and any other device that allows the system 300 to receive input from a developer and/or a user. The computer 308 includes system hardware 320 and random access memory and/or read-only memory 330. A file store 380 is communicatively connected to computer 308. File store 380 may be internal such as, e.g., one or more hard drives, or external such as, e.g., one or more external hard drives, network attached storage, or a separate storage network.

Memory 330 includes an operating system 340 for managing operations of computer 308. In one embodiment, operating system 340 includes a hardware interface module 354 that provides an interface to system hardware 320. In addition, operating system 340 includes one or more file systems 350 that manage files used in the operation of computer 308 and a process control subsystem 352 that manages processes executing on computer 308. Operating system 340 further includes a system call interface module 342 that provides an interface between the operating system 340 and one or more application modules 362.

In operation, one or more application modules and/or libraries executing on computer 308 make calls to the system call interface module 342 to execute one or more commands on the computer's processor. The system call interface module 342 invokes the services of the file system(s) 350 to manage the files required by the command(s) and the process control subsystem 352 to manage the process required by the command(s). The file system(s) 350 and the process control subsystem 352, in turn, invoke the services of the hardware interface module 354 to interface with the system hardware 320.

The particular embodiment of operating system 340 is not critical to the subject matter described herein. Operating system 340 may be embodied as a UNIX operating system or any derivative thereof (e.g., Linux, Solaris, etc.) or as a Windows™ brand operating system.

In some embodiments, computer system 300 includes one or more modules to implement hybrid database query caching. In the embodiment depicted in FIG. 3, computer system 300 includes a surface analysis module 362 which implements the operations described with reference to FIG. 2.

In some embodiments, the optical thickness of a wafer 140 may be assumed to be T=nt, where n represents the refractive index of the wafer and t represents the wafer thickness. The wafer may be positioned in the cavity defined by the reference flats such that the difference between the front reference flat 130 and the front wafer surface equals 3 T, and the distance between the back reference flat 150 and the back surface is 5 T. Since the interferograms are a function of the distances or T, 3 T, 4 T, 5 T, and 9 T, respectively, the superimposed interferogram recorded by the detector 170 can be successfully separated and the phase of each interferogram can be extracted using techniques described in U.S. Pat. No. 6,885,461 or U.S. Pat. No. 6,359,692, the disclosures of which are incorporated herein by reference.

While the invention has been particularly shown and described with reference to a preferred embodiment and various alternate embodiments, it will be understood by persons skilled in the relevant art that various changes in form and details can be made therein without departing from the spirit and scope of the invention. While the invention has been particularly shown and described with reference to a preferred embodiment and various alternate embodiments, it will be understood by persons skilled in the relevant art that various changes in form and details can be made therein without departing from the spirit and scope of the invention.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method for obtaining at least one of shape, thickness, and inhomogeneity of an object having first and second opposing surfaces, the method comprising:
providing an interferometer comprising:
  a first reference surface;
  a second reference surface disposed substantially parallel to the first reference surface; and
  a cavity defined between the first reference surface and the second reference surface;
receiving an object into the cavity such that the first surface of the object is facing the first reference surface and the second surface of the object is facing the second reference surface, where an optical path remains unobstructed by the object between the first reference surface and the second reference surface;
directing a light into the interferometer through only the first reference surface, such that the light produces;
  a first reflected light that comprises a portion of the light that is reflected from the first reference surface,
  a second reflected light that comprises a portion of the light that is reflected from the second reference surface along the unobstructed optical path,
  a third reflected light that comprises a portion of the light that is reflected from the first surface of the object, and
  a fourth reflected light that comprises a portion of the light that is reflected from the second surface of the object;
contemporaneously recording multiple interferograms generated by phase differences in the reflected lights;
separating the contemporaneously recorded interferograms into individual interferograms, including;
  an A interferogram representing phase differences between the first and third reflected lights;
  a B interferogram representing phase differences between the second and fourth reflected lights;
  a T interferogram representing phase differences between the third and fourth reflected lights; and
  a C interferogram representing phase differences between the first and second reflected lights;
computing a height of the first surface of the object from the phase differences of the A interferogram;
computing a height of the second surface of the object from the phase differences of the B interferogram;
computing a thickness of the object from subtracting a sum of the phase differences of the A interferogram and the phase differences of the B interferogram from the phase differences of the C interferogram; and
computing a material inhomogeneity of the object by subtracting the phase differences of the C interferogram from the sum of the phase differences of the A interferogram, the phase differences of the B interferogram, and the phase differences of the T interferogram.

2. The method according to claim 1, further comprising monitoring tilt change between the first reference surface and the second reference surface.

3. The method according to claim 1, wherein the object is placed a first predetermined distance from the first reference surface and a second different predetermined distance from the second reference surface.

4. A method for obtaining at least one of the shape, thickness variation, and inhomogeneity of objects having a plurality of surfaces comprising:
initiating an unequal path interferometer assembly comprising:
  a first reference flat having a first length in a first dimension;
  a second reference flat having a second length in the first dimension;
  a cavity defined by a distance between the first reference flat and the second reference flat; and a receptacle to receive an object in the cavity such that an optical path remains open between the first reference flat and the second reference flat;

receiving and object into the cavity;

receiving a coherent tunable light source to the unequal path interferometer assembly;

recording multiple optical interferograms in response to known phase shifts produced by changes in the wavelength of light from the tunable source;

extracting phases of each of the interferograms to produce multiple phase maps; and determining each phase map from its corresponding interferogram using a weighted least square algorithm;

determining the object material inhomogeneity by analyzing:

the sum of:

the phase of the interferograms formed by the light reflected from the first object surface and the light reflected from the second object surface;

the phase of the interferogram formed by the light reflected from the first reference surface and the light reflected from the first object surface; and the phase of the interferogram formed by the light reflected from the second reference surface and the light reflected from the second object surface; and subtracting the phase of the interferogram formed by the light reflected from the first reference surface and the light reflected from the second reference surface.

5. An interferometer comprising:

a first reference surface;

a second reference surface;

a cavity defined between the first reference surface and the second reference surface, where the cavity receives an object having first and second surfaces, such that an optical path remains open between the first reference surface and the second reference surface;

a radiation targeting assembly to direct a collimated radiation beam through the first reference surface and toward the second reference surface;

a radiation collecting assembly to collect reflected radiation returning from and through the first reference surface, including a first reflected light that comprises a portion of the light that is reflected from the first reference surface, a second reflected light that comprises a portion of the light that is reflected from the second reference surface along the unobstructed optical path, a third reflected light that comprises a portion of the light that is reflected from the first surface of the object, and a fourth reflected light that comprises a portion of the light that is reflected from the second surface of the object; and a controller comprising logic to:

vary a wavelength of the collimated radiation beam;

contemporaneously record interferograms formed by the plurality of surfaces;

separate the contemporaneously recorded interferograms into individual interferograms, including:

an A interferogram representing phase differences between the first and third reflected lights;

a B interferogram representing phase differences between the second and fourth reflected lights;

a T interferogram representing phase differences between the firs and second reflected lights;

compute a height of the first surface of the object from the phase differences of the A interferogram;

compute a height of the second surface of the object from the phase differences of the B interferogram;

compute a thickness of the object from subtracting a sum of the phase differences of the A interferogram and the phase differences of the B interferogram from the phase differences of the C interferogram; and compute a material inhomogeneity of the object by subtracting the phase differences of C interferogram from the sum of the phase differences of the A interferogram, the phase differences of the B interferogram, and the phase differences of the T interferogram.

6. The system according to claim 5, further comprising logic to monitor tilt change of the reference surfaces with measurements thereby increasing measurement reliability.

7. The system according to claim 5, wherein the radiation targeting assembly comprises a tunable laser.

8. The system according to claim 5, wherein the object is placed in the cavity in a first predetermined distance from the first reference surface and a second different predetermined distance from the second reference surface.

9. The system according to claim 8, wherein:

the first predetermined distance is 3 T, where T is an optical thickness of the object; and the second different predetermined distance is 5 T.

10. An unequal path interferometer system, comprising:

and unequal path interferometer assembly comprising a first reference flat having a first length in a first dimension;

a second reference flat having a second length in the first dimension;

a cavity defined by a distance between the first reference flat and the second reference flat; and a receptacle to receive an object in the cavity such that an optical path remains open between the first reference flat and the second reference flat; and an object placed in the cavity in the interferometer assembly;

a radiation targeting assembly to direct a collimated radiation beam to the interferometer assembly;

a radiation collecting assembly to collect radiation received from the interferometer assembly; and a controller comprising logic to:

vary a wavelength of the collimated radiation beam;

record interferograms formed by a plurality of surfaces of the object and reference flats;

extract phases of each of the interferograms to produce multiple phase maps; and determine each phase map from its corresponding interferogram using a weighted least-square algorithm;

wherein the object material inhomogeneity may be determined by analyzing:

the sum of the phase of the interferogram formed by the light reflected from the first object surface and the light reflected from the second object surface, the phase of the interferogram formed by the light reflected from the first reference surface and the light reflected from the first object surface, and the phase of the interferogram formed by the light reflected from the second reference surface and the light reflected from the second object surface; and subtracting the phase of the interferogram formed by the light reflected from the first reference surface and the light reflected from the second reference surface.

* * * * *